United States Patent
Okutani et al.

(10) Patent No.: US 11,015,704 B2
(45) Date of Patent: May 25, 2021

(54) APPARATUS AND METHOD FOR CONTROLLING CONTINUOUSLY VARIABLE TRANSMISSION

(71) Applicants: JATCO Ltd, Fuji (JP); NISSAN MOTOR CO., LTD., Yokohama (JP)

(72) Inventors: Sho Okutani, Isehara (JP); Takashi Koguchi, Yokohama (JP); Makoto Komatsu, Hadano (JP); Takashi Nobukawa, Hadano (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/642,047

(22) PCT Filed: Aug. 7, 2018

(86) PCT No.: PCT/JP2018/029539
§ 371 (c)(1),
(2) Date: Feb. 26, 2020

(87) PCT Pub. No.: WO2019/049583
PCT Pub. Date: Mar. 14, 2019

(65) Prior Publication Data
US 2021/0071755 A1 Mar. 11, 2021

(30) Foreign Application Priority Data
Sep. 11, 2017 (JP) .............................. JP2017-173689

(51) Int. Cl.
*F16H 59/18* (2006.01)
*F16H 59/14* (2006.01)
*F16H 61/662* (2006.01)

(52) U.S. Cl.
CPC ........... *F16H 59/18* (2013.01); *F16H 59/141* (2013.01); *F16H 61/662* (2013.01); *F16H 2200/0034* (2013.01); *F16H 2702/02* (2013.01)

(58) Field of Classification Search
CPC ...... F16H 59/18; F16H 61/662; F16H 59/141; F16H 2702/02; F16H 2200/0034
See application file for complete search history.

(56) References Cited

U.S. PATENT DOCUMENTS

2010/0227736 A1  9/2010  Takahashi
2014/0342876 A1* 11/2014  Tanaka .................. B60W 10/04
                                                      477/115

(Continued)

FOREIGN PATENT DOCUMENTS

JP    2010-209946 A    9/2010
WO   WO-2015/045964 A1  4/2015

*Primary Examiner* — Justin Holmes
(74) *Attorney, Agent, or Firm* — Foley & Lardner LLP

(57) ABSTRACT

A vehicle has an engine (1) as a driving source. Output rotation of the engine (1) is transmitted to driving wheels (7) through a torque converter (2) equipped with a lock-up clutch, a first gear train (3), a transmission (4) formed by combination of a variator (20) and an auxiliary transmission (30), a second gear train (5) and a final speed reduction device (6). The second gear train (5) is provided with a parking mechanism (8) that mechanically locks an output shaft of the transmission (4) so that the output shaft of the transmission (4) cannot rotate during parking of the vehicle. A shift speed when down-shift is performed by the variator (20) during a torque-down request to the engine (1) is set to be slower than a shift speed when down-shift is performed by the variator (20) during a non-torque-down request.

2 Claims, 4 Drawing Sheets

(56) References Cited

U.S. PATENT DOCUMENTS

2016/0215879 A1    7/2016   Inoue
2017/0021834 A1*   1/2017   Tohta .................... B60W 10/06
2019/0024791 A1*   1/2019   Waku ...................... F16H 61/66

* cited by examiner

APPARATUS AND METHOD FOR CONTROLLING CONTINUOUSLY VARIABLE TRANSMISSION

The present invention relates to a control device of a continuously variable transmission and a method of controlling the continuously variable transmission.

Background Art

Patent Document 1 discloses a technique that, in a configuration in which an auxiliary transmission is connected to a continuously variable transmission (hereinafter, called a variator) in series, performs torque-down such that torque of a driving source is limited to a limit value or less when a speed (a shift stage or a shift position) of the auxiliary transmission is changed.

Here, since a target turbine rotation speed is increased with increase in accelerator pedal depression amount, the variator downshifts toward a transmission ratio for achieving the target turbine rotation speed. At the time of the downshift, if torque inputted to the variator from the driving source is smaller than inertia torque generated by the downshift of the variator due to the torque-down, there arises a problem of causing decrease in acceleration (or causing poor acceleration). The present invention was made in view of this technical problem. An object of the present invention is therefore to provide a control device of the continuously variable transmission which is capable of suppressing the decrease in acceleration (suppressing the poor acceleration) when performing the downshift of the variator during the torque-down of an engine.

CITATION LIST

Patent Document

Patent Document 1: Japanese Unexamined Patent Application Publication No. JP2010-209946

SUMMARY OF THE INVENTION

In the present invention, a shift speed when down-shift is performed by the variator during a torque-down request to the engine is set to be slower than a shift speed when down-shift is performed by the variator during a non-torque-down request.

Therefore, an inertia torque generated at the down-shift of the variator can be suppressed, then the decrease in acceleration can be suppressed.

EMBODIMENTS FOR CARRYING OUT THE INVENTION

[Embodiment 1]

Figure 1:
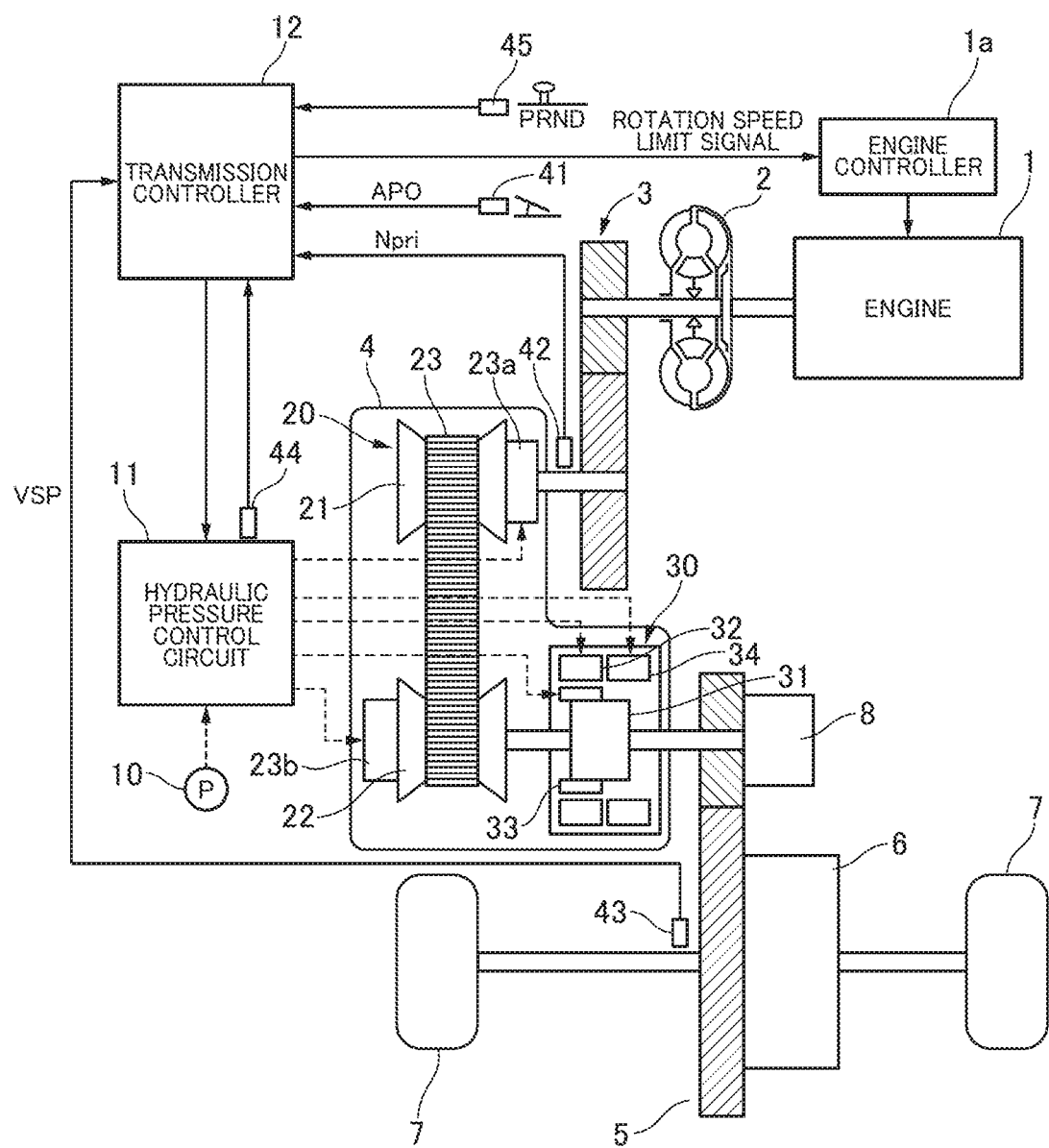
FIG. 1 is a schematic system diagram of a vehicle having a continuously variable transmission according to an embodiment 1.

An embodiment of the present invention will be explained below with reference to the drawings. In the following explanation, "transmission ratio" of a certain transmission mechanism is a value obtained by dividing an input rotation speed of the transmission mechanism by an output rotation speed of the transmission mechanism. Further, "Lowest transmission ratio" means a maximum transmission ratio of the transmission mechanism, while "Highest transmission ratio" means a minimum transmission ratio of the transmission mechanism. FIG. 1 is a schematic system diagram of a vehicle having a continuously variable transmission according to an embodiment 1 of the present invention. This vehicle has an engine 1 as a driving source. Output rotation of the engine 1 is transmitted to driving wheels 7 through a torque converter 2 equipped with a lock-up clutch, a first gear train 3, a variator 20, an auxiliary transmission 30 (hereinafter, these variator 20 and auxiliary transmission 30 are collectively simply called a transmission 4), a second gear train 5 and a final speed reduction device 6. The second gear train 5 is provided with a parking mechanism 8 that mechanically locks an output shaft of the transmission 4 so that the output shaft of the transmission 4 cannot rotate during parking of the vehicle.

Further, the vehicle is provided with an engine controller 1a that controls the engine 1, an oil pump 10 that is driven by using a part of power of the engine 1, a hydraulic pressure control circuit 11 that controls a hydraulic pressure from the oil pump 10 and provides it to each part of the transmission 4, and a transmission controller 12 as a control device that controls the hydraulic pressure control circuit 11.

Each configuration will be explained below. The transmission 4 has the variator 20 and the auxiliary transmission 30 connected to the variator 20 in series. "Connected in series" means that the variator 20 and the auxiliary transmission 30 are connected in series on a same power transmission path. The auxiliary transmission 30 is directly connected to an output shaft of the variator 20 as shown in this embodiment, or could be connected to the variator 20 through another transmission mechanism or another power transmission mechanism (for instance, a gear train)

The variator 20 is a belt-type continuously variable transmission having a primary pulley 21, a secondary pulley 22 and a V-belt 23 wound around these pulleys 21 and 22 and rotating around these pulleys 21 and 22. Each of the primary pulley 21 and the secondary pulley 22 has a stationary conical plate (a stationary sheave) and a movable conical plate (a movable sheave) that is set with both sheave surfaces of the stationary and movable conical plates facing each other so as to form a V-shaped groove between the stationary and movable conical plates. Further, the primary pulley 21 and the secondary pulley 22 have hydraulic cylinders 23a and 23b respectively, each of which is provided on a back surface of the movable conical plate and moves the movable conical plate in an axial direction of the movable conical plate. When controlling a hydraulic pressure provided to the hydraulic cylinders 23a and 23b, each width of the V-shaped groove varies, and each contact radius between the V-belt 23 and each of the pulleys 21 and 22 varies, then a transmission ratio vRatio of the variator 20 continuously varies.

Figure 2:
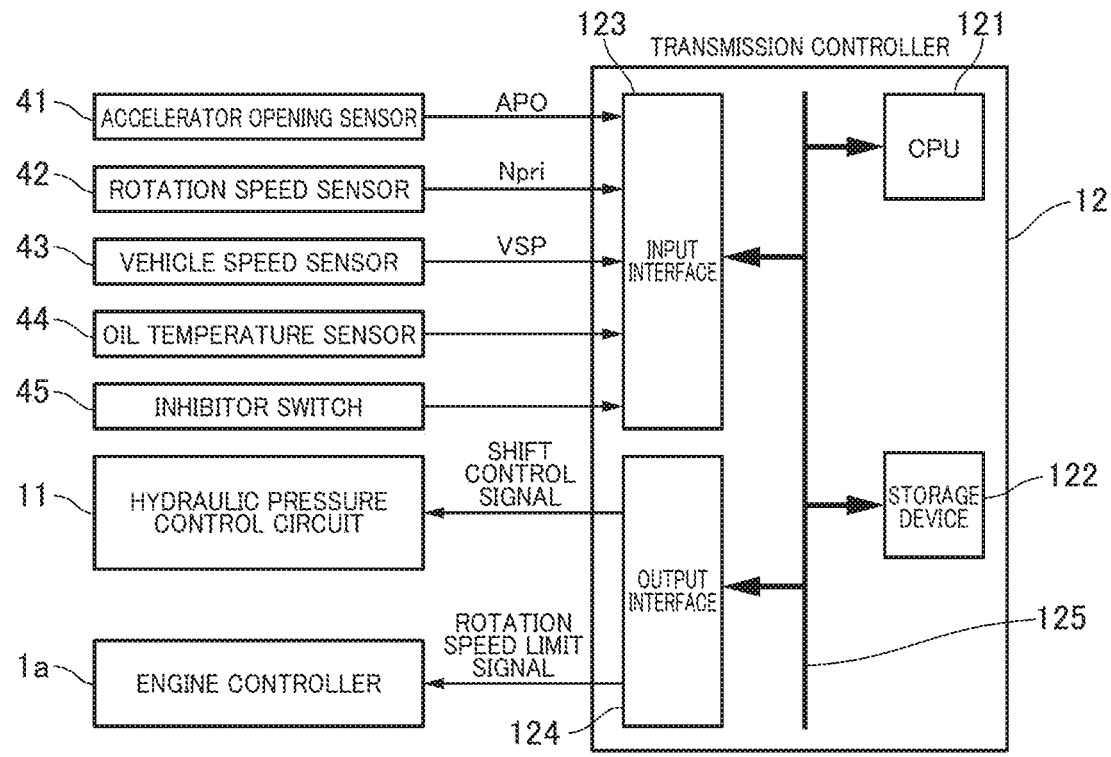
FIG. 2 is a diagram showing an inside configuration of a transmission controller according to the embodiment 1.

The auxiliary transmission 30 is a transmission mechanism of forward 2 speeds and reverse 1 speed. The auxiliary transmission 30 has a ravigneaux planetary gear mechanism 31 in which carriers of two planetary gears are connected and a plurality of frictional engagement elements (a Low brake 32, a High clutch 33 and a Rev brake 34) which are engaged with a plurality of rotational elements that form the ravigneaux planetary gear mechanism 31 and which change their engagement states. When controlling a supply pressure to each of the frictional engagement elements 32 to 34 and changing an engaging/disengaging state of each of the frictional engagement elements 32 to 34, a speed (a shift stage or a shift position) of the auxiliary transmission 30 is changed. For instance, when the Low brake 32 is engaged and the High clutch 33 and the Rev brake 34 are each disengaged, the speed of the auxiliary transmission 30 is 1st speed. When the High clutch 33 is engaged and the Low brake 32 and the Rev brake 34 are each disengaged, the speed of the auxiliary transmission 30 is 2nd speed whose transmission ratio is smaller than that of the 1st speed. When the Rev brake 34 is engaged and the Low brake 32 and the High clutch 33 are each disengaged, the speed of the auxiliary transmission 30 is the reverse speed. In the following explanation, when the speed of the auxiliary transmission 30 is 1st speed, this is called "the transmission 4 is in a low speed mode", and when the speed of the speed of the auxiliary transmission 30 is 2nd speed, this is called "the transmission 4 is in a high speed mode". FIG. 2 is a diagram showing an inside configuration of the transmission controller 12 according to the embodiment 1. As shown in FIG. 2, the transmission controller 12 is configured by a CPU 121, a storage device 122 having RAM and ROM, an input interface 123, an output interface 124 and a bus 125 connecting these components to each other.

The input interface 123 inputs an output signal of an accelerator opening degree sensor 41 that detects an opening degree of an accelerator pedal (hereinafter, called an accelerator opening APO), an output signal of a primary rotation speed sensor 42 that detects an input rotation speed of the transmission 4 (=a rotation speed of the primary pulley 21, hereinafter, called a primary rotation speed Npri), an output signal of a vehicle speed sensor 43 that detects a travelling speed of the vehicle (hereinafter, called a vehicle speed VSP), an output signal of an oil temperature sensor 44 that detects an oil temperature of the transmission 4, an output signal of an inhibitor switch 45 that detects a position of a selection lever, and so on.

The storage device 122 stores a shift control program of the transmission 4 and a shift map (FIG. 3) used for this shift control program. The CPU 121 reads the shift control program stored in the storage device 122 and executes it. Also, the CPU 121 generates a shift control signal by performing computation for each signal inputted through the input interface 123, and outputs the generated shift control signal to the hydraulic pressure control circuit 11 through the output interface 124.

Further, when performing an up-shift of the auxiliary transmission 30, a torque-down request value for suppressing an input torque to the auxiliary transmission 30 is outputted to the engine controller 1a. The torque-down request value is a value that indicates an upper limit value of an engine torque which is set according to an accelerator pedal depression amount. The torque-down request is outputted to promote the progress of an inertia phase of the auxiliary transmission 30. During the torque-down request, a torque-down request flag is turned ON. During non-torque-down request, the torque-down request flag is turned OFF. Each value used for the computation by the CPU 121 and its computation result are stored in the storage device 122 as appropriate.

The hydraulic pressure control circuit 11 is formed by a plurality of flow passages and a plurality of hydraulic pressure control valves. The hydraulic pressure control circuit 11 changes a hydraulic pressure supply passage by controlling the plurality of hydraulic pressure control valves on the basis of the shift control signal from the transmission controller 12, also controls (regulates) a required pressure from the hydraulic pressure generated by the oil pump 10 and supplies this pressure to each part of the transmission 4. With this, the transmission ratio vRatio of the variator 20 and the speed (the shift stage or the shift position) of the auxiliary transmission 30 are changed, then shift of the transmission 4 is carried out.

Figure 3:
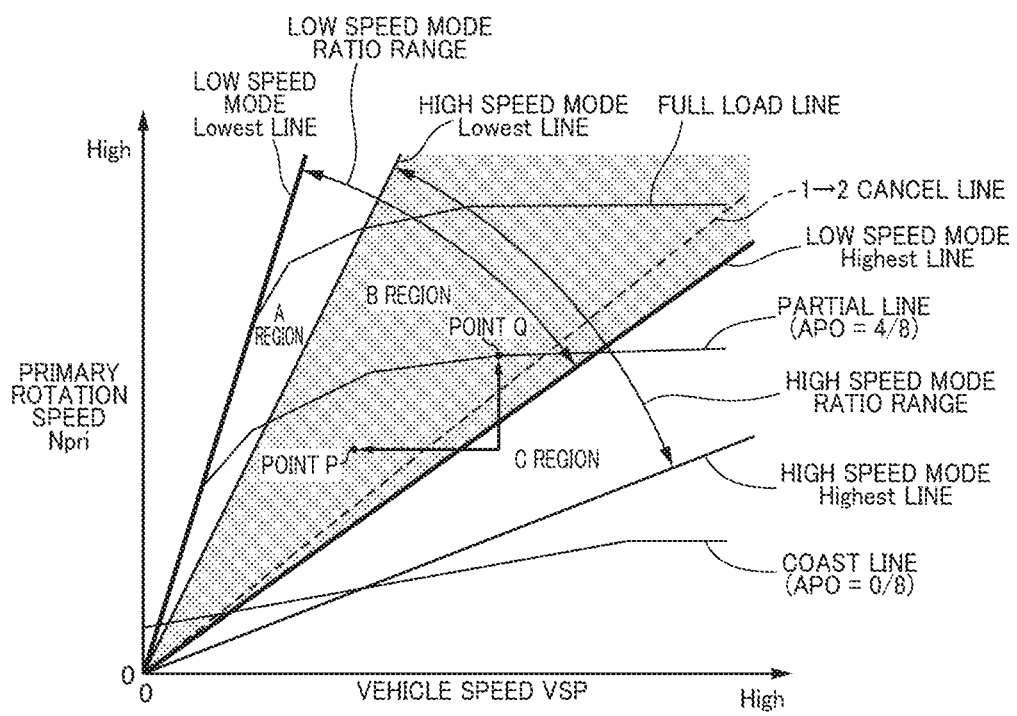
FIG. 3 is a diagram showing an example of a shift map according to the embodiment 1.

FIG. 3 shows an example of the shift map stored in the storage device 122 of the transmission controller 12. An operating point of the transmission 4 is determined on the basis of the vehicle speed VSP and the primary rotation speed Npri on the shift map. A gradient of a line connecting the operating point of the transmission 4 and a zero point at a lower left corner of the shift map indicates a transmission ratio of the transmission 4 (a total transmission ratio obtained by multiplying the transmission ratio vRatio of the variator 20 by a transmission ratio subRatio of the auxiliary transmission 30, hereinafter, called "a through transmission ratio Ratio") . On this shift map, in the same manner as a conventional shift map of a belt-type continuously variable transmission, a shift line is set for each accelerator opening APO. The shift of the transmission 4 is carried out in accordance with the shift line selected according to the accelerator opening APO. Here, in FIG. 3, to simplify the shift map, only a full load line (a shift line of the accelerator opening APO=8/8) , a partial line (a shift line of the accelerator opening APO=4/8) and a. coast line (a shift line of the accelerator opening APO=0) are illustrated.

When the transmission 4 is in the low speed mode, the shift of the transmission 4 can be varied between a low speed mode Lowest line obtained by setting the transmission ratio vRatio of the variator 20 to the maximum and a low speed mode Highest line obtained by setting the transmission ratio vRatio of the variator 20 to the minimum. At this time, the operating point of the transmission 4 moves in an A region and a B region. On the other hand, when the transmission 4 is in the high speed mode, the shift of the transmission 4 can be varied between a high speed mode Lowest line obtained by setting the transmission ratio vRatio of the variator 20 to the maximum and a high speed mode Highest line obtained by setting the transmission ratio vRatio of the variator 20 to the minimum. At this time, the operating point of the transmission 4 moves in the B region and a C region.

The transmission ratio of each speed (each shift stage or each shift position) of the auxiliary transmission 30 is set so that a transmission ratio (a low speed mode Highest transmission ratio) corresponding to the low speed mode Highest line is smaller than a transmission ratio (a high speed mode Lowest transmission ratio) corresponding to the high speed mode Lowest line. With this setting, a low speed mode ratio range that is a range of the through transmission ratio Ratio, which can be taken in the low speed mode, of the transmission 4 and a high speed mode ratio range that is a range of the through transmission ratio Ratio, which can be taken in the high speed mode, of the transmission 4 partly overlap each other. When the operating point of the transmission 4 is positioned in the B region defined between the high speed mode Lowest line and the low speed mode Highest line, as the mode of the transmission 4, either of the low speed mode and the high speed mode can be selected.

The transmission controller 12 reads this shift map and sets the through transmission ratio Ratio corresponding to the vehicle speed VSP and the accelerator opening APO (an operating condition of the vehicle) as an attainment through transmission ratio DRatio. This attainment through transmission ratio DRatio is a target value which the through transmission ratio Ratio should finally attain or reach in this operating condition. The transmission controller 12 sets a target through transmission ratio tRatio that is a transient target value in order for the through transmission ratio Ratio to follow the attainment through transmission ratio DRatio with a predetermined response characteristic, and controls the variator 20 and the auxiliary transmission 30 so that the through transmission ratio Ratio is fitted to or identical with the target through transmission ratio tRatio.

Then, when the operatingpoint of the transmission 4 moves from the B region to the A region, the transmission controller 12 starts to perform a down-shift control of the auxiliary transmission 30 and an up-shift control of the variator 20. When the operating point of the transmission 4 moves from the B region to the C region, the transmission controller 12 starts to perform an up-shift control of the auxiliary transmission 30 and a down-shift control of the variator 20. That is, the transmission controller 12 carries out a cooperative shift control that performs the shift of the auxiliary transmission 30 and also changes the transmission ratio vRatio of the variator 20 in a direction opposite to a direction of change of the transmission ratio subRatio of the auxiliary transmission 30.

In the cooperative shift control, when the operating point of the transmission 4 moves from the B region to the C region, the transmission controller 12 changes the speed (the shift stage or the shift position) of the auxiliary transmission 30 from 1st speed to 2nd speed (hereinafter, called a 1→2 shift), and also changes the transmission ratio vRatio of the variator 20 to a large transmission ratio side. Conversely, when the operating point of the transmission 4 moves from the B region to the A region, the transmission controller 12 changes the speed (the shift stage or the shift position) of the auxiliary transmission 30 from 2nd speed to 1st speed (hereinafter, called a 2→1 shift) , and also changes the transmission ratio vRatio of the variator 20 to a small transmission ratio side. Carrying out of the cooperative shift control is for suppressing an odd feeling (or an awkward feeling) which a driver feels due to change of an input rotation which occur by a step of the through transmission ratio Ratio of the transmission 4.

(Shift Speed Setting Operation During Torque-Down Request)

When changing the speed (the shift stage or the shift position) of the auxiliary transmission 30 from 1st speed to 2nd speed, so-called changeover control by which the Low brake 32 is disengaged and the High clutch 33 is engaged is carried out. More specifically, an engagement capacity of the Low brake 32 is reduced from a full engagement capacity to a smallest engagement capacity capable of transmitting a current engine torque. Then, while an engagement capacity of the High clutch 33 is gradually increased, the engagement capacity of the Low brake 32 is gradually reduced. With this changeover, the inertia phase during which the transmission ratio is gradually changed from 1st speed to 2nd speed is performed. At this time, although there is a need to increase an engine rotation speed at the inertia phase, if the torque inputted from the engine 1 is too large, it becomes difficult for the shift to progress . Further, there is a risk that the engine rotation speed will surge (engine racing will occur) when reducing the engagement capacity of the Low brake 32 to the smallest engagement capacity. Therefore, by outputting the torque-down request value to the engine controller 1a, the inertia phase is promoted.

As shown on the shift map in FIG. 3, for instance, the operating point moves from a travelling state at a point P in the B region to the C region by and according to increase of the vehicle speed VSP, and while a request for the up-shift of the speed (the shift stage or the shift position) of the auxiliary transmission 30 from 1st speed to 2nd speed is outputted, the torque-down request value is outputted. This torque-down request value is requested as the upper limit value of the torque outputted from the engine 1. Next, in a case where the driver depresses the accelerator pedal by a change of his/her mind before the inertia phase starts during the torque-down request, when the operating point moves to a point Q in the B region and crosses a 1→2 cancel line by which the up-shift from 1st speed to 2nd speed is cancelled, the up-shift of the auxiliary transmission 30 is cancelled, and the down-shift of the variator 20 is started.

At this time, to perform the down-shift of the variator 20 during the torque-down request, there is a need to increase a rotation speed at the engine side with respect to the variator 20 (hereinafter, called an input side rotation speed). Here, if a shift speed of the variator 20 is a shift speed that is set in a normal control, due to increase of an inertia torque by and according to a surge of the input side rotation speed (hereinafter, this is simply called the inertia torque), there is a case where the inertia torque exceeds the torque-down request value. In this case, torque outputted to the driving wheels 7 is reduced, then abrupt decrease in acceleration, i.e. a pull-in shock (or a drag shock), may occur (see a comparative example in a characteristic of back-and-forth G in FIG. 6). Thus, in the embodiment 1, when performing the down-shift of the variator 20 during the torque-down request, the shift speed of the variator 20 is set to a slower shift speed than that in the normal control, then the increase of the inertia torque is suppressed.

Figure 4:
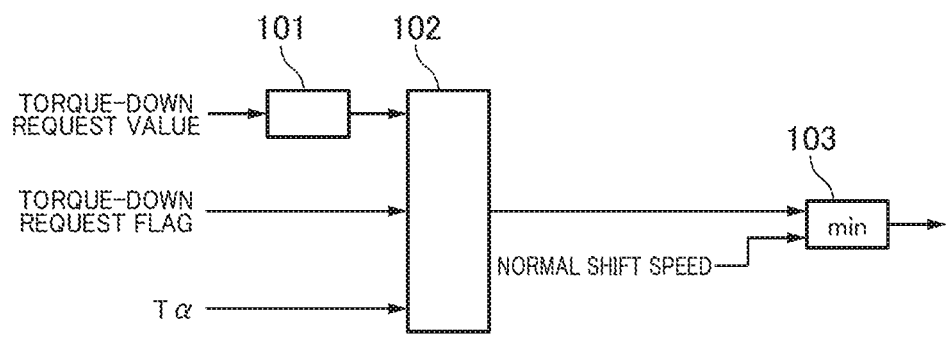
FIG. 4 is a control block diagram showing a shift speed setting operation of the embodiment 1.
Figure 5:
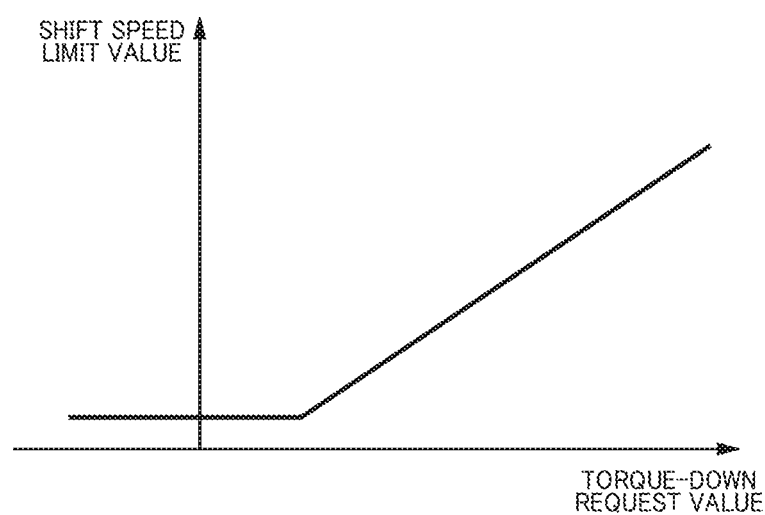
FIG. 5 is a shift speed limit value map of the embodiment 1.

FIG. 4 is a control block diagram showing a shift speed setting operation of the embodiment 1. A shift speed limit value calculating unit 101 calculates a shift speed limit value on the basis of the torque-down request value from a limit value map shown in FIG. 5. FIG. 5 is a shift speed limit value map of the embodiment 1. When the torque-down request value is small, since there is a tendency for the inertia torque to exceed the torque-down request value, the shift speed is limited such that the shift speed is low (slow). On the other hand, as the torque-down request value is greater, the shift speed is limited such that the shift speed is higher (faster). With this setting, the shift speed according to the input torque can be realized.

A shift speed limit value setting unit 102 outputs the shift speed limit value calculated by the shift speed limit value calculating unit 101 when the torque-down request flag is ON, also outputs a predetermined value Tα that is a large value and does not substantially impose a limit on the shift speed when the torque-down request flag is OFF. A shift speed setting unit 103 compares the value set by the shift speed limit value setting unit 102 with a normal shift speed set in the normal control, and outputs a smaller value (a lower value) as the shift speed. Therefore, when the torque-down request flag is ON, the shift speed limit value that is smaller than the normal shift speed is outputted. On the other hand, when the torque-down request flag is OFF, since the predetermined value Tα is larger than the normal shift speed, the normal shift speed is outputted.

Figure 6:
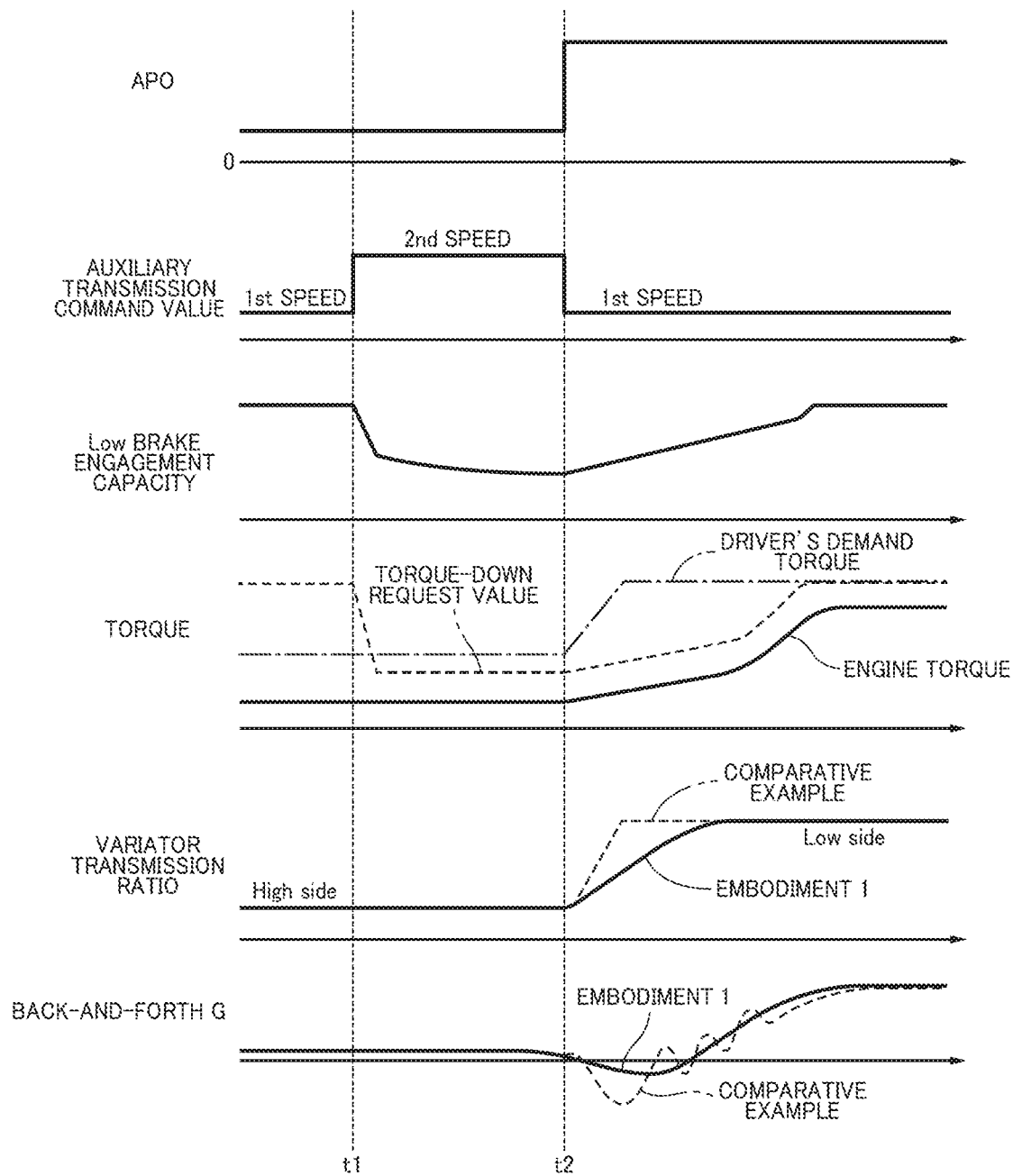
FIG. 6 is a time chart showing the shift speed setting operation of the embodiment 1.

FIG. 6 is a time chart showing the shift speed setting operation of the embodiment 1. Here, an initial travelling state is the operating point positioned at the point P in the B region on the shift map shown in FIG. 3. At time t1, the operating point moves from the B region to the C region, and while an up-shift command is outputted to the auxiliary transmission 30, the torque-down request value is outputted to the engine controller 1a. Therefore, the torque outputted to the driving wheels 7 is limited to a small torque as compared withdriver's demand torque . At time t2 at which the driver depresses the accelerator pedal before the inertia phase of the auxiliary transmission 30 starts then the operating point moves the C region to the B region, the up-shift of the auxiliary transmission 30 is cancelled. Then, the down-shift of the variator 20 is started. At this time, in a case of a comparative example that does not impose a limit on the shift speed, since the inertia torque increases at once, the torque outputted to the driving wheels 7 is abruptly decreased, then back and forth acceleration increases while varying by and according to this torque decrease. In contrast to this, in the embodiment 1, since the limit is imposed on the shift speed, no abrupt increase of the inertia torque occurs, and the torque outputted to the driving wheels 7 becomes stable, thereby suppressing the pull-in shock (or the drag shock).

As explained above, the embodiment 1 obtains the following effects.

(1) In a control device and a controlling method of a variator 20 provided between an engine 1 and driving wheels 7 and being able to continuously vary a transmission ratio, a shift speed when down-shift is performed by the variator 20 during a torque-down request to the engine 1 is set to be slower than a shift speed when down-shift is performed by the variator 20 during a non-torque-down request.

It is therefore possible to avoid a situation where the engine torque is smaller than the inertia torque, thereby suppressing the decrease in acceleration.

(2) The variator 20 is provided with the auxiliary transmission 30 that is connected to the variator 20 in series and has, forward speeds, 1st speed and 2nd speed. That is, when performing the up-shift, the torque-down request is outputted. At this time, even if a situation where the up-shift is cancelled by a change of driver's mind and the variator 20 downshifts arises, the decrease in acceleration can be suppressed.

Although the embodiment for carrying out the present invention has been explained on the basis of the above embodiment, a specified configuration of the present invention is not limited to that in the above embodiment. The configuration includes all design modifications and equivalents belonging to the technical scope of the present invention.

For example, in the above embodiment, the vehicle has the belt-type continuously variable transmission mechanism as the variator 20. However, the variator 20 could be a continuously variable transmission mechanism in which a chain is wound around the pulleys 21 and 22 and rotates around the pulleys 21 and 22, instead of the V-belt 23. Further, the variator 20 maybe a toroidal-type continuously variable transmission mechanism in which a power roller that can roll while inclining is arranged between an input disk and an output disk.

Further, in the above embodiment, the auxiliary transmission 30 is the transmission mechanism having 2 speeds (two shift stages or two shift positions) of 1st speed and 2nd speed as the forward shift stage. However, the auxiliary transmission 30 could be a transmission mechanism having three or more forward shift stages. Furthermore, the auxiliary transmission 30 is formed using the ravigneaux planetary gear mechanism. However, the structure of the auxiliary transmission 30 is not limited to the ravigneaux planetary gear mechanism. For instance, the auxiliary transmission 30 could be formed by combination of a normal planetary gear mechanism and frictional engagement elements, or might be formed by a plurality of power transmission paths that are formed by a plurality of gear trains having different transmission ratios and frictional engagement elements that change the power transmission path. Moreover, although the hydraulic cylinders 23a and 23b are provided as actuators that move the movable conical plates of the pulleys 21 and 22 in the axial direction, the actuator is not limited to the hydraulic actuator, but could be an electric-driven actuator.

The invention claimed is:

1. A control device of a continuously variable transmission, the continuously variable transmission including a variator provided between an engine and driving wheels and being able to continuously vary a transmission ratio and an auxiliary transmission connected to the variator in series and having, forward speeds, 1st speed and 2nd speed whose transmission ratio is smaller than that of the 1st speed, the control device comprising:
   a controller configured to
   when performing up-shift of the auxiliary transmission from the 1st speed to the 2nd speed, output a torque-down request to the engine,
   when a driver depresses an accelerator pedal before an inertia phase of the auxiliary transmission starts during the torque-down request, cancel the up-shift, and start down-shift of the variator, and
   set a shift speed of the down-shift of the variator during the torque-down request to be slower than a shift speed of the down-shift of the variator during a non-torque-down request.

2. A method of controlling a continuously variable transmission, the continuously variable transmission including a variator provided between an engine and driving wheels and being able to continuously vary a transmission ratio and an auxiliary transmission connected to the variator in series and having, forward speeds, 1st speed and 2nd speed whose transmission ratio is smaller than that of the 1st speed, the method comprising:
   when performing up-shift of the auxiliary transmission from the 1st speed to the 2nd speed, outputting a torque-down request to the engine;
   when a driver depresses an accelerator pedal before an inertia phase of the auxiliary transmission starts during the torque-down request, cancelling the up-shift, and starting down-shift of the variator; and
   setting a shift speed of the down-shift of the variator during the torque-down request to be slower than a shift speed of the down-shift of the variator during a non-torque-down request.

* * * * *